Oct. 4, 1932.  C. C. FORNEY  1,881,122
EGG TRANSFERRING AND SORTING TRAP NEST
Filed April 13, 1931  4 Sheets-Sheet 1
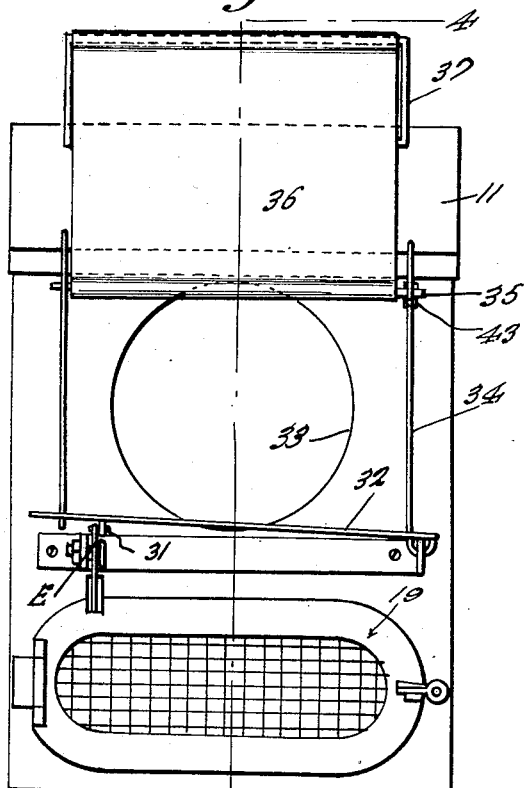
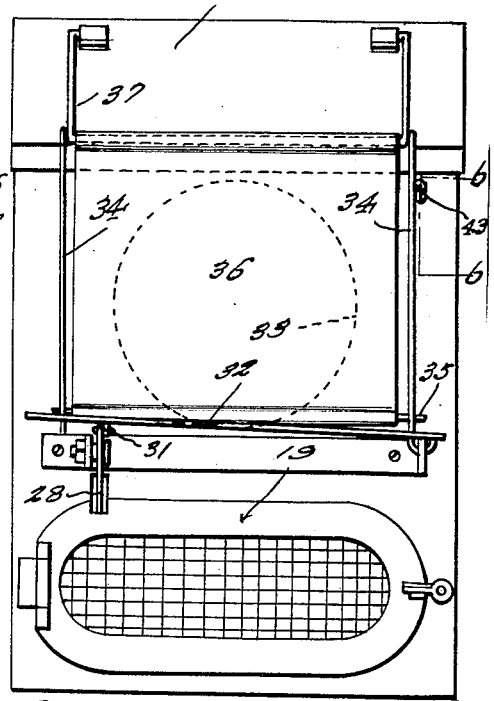
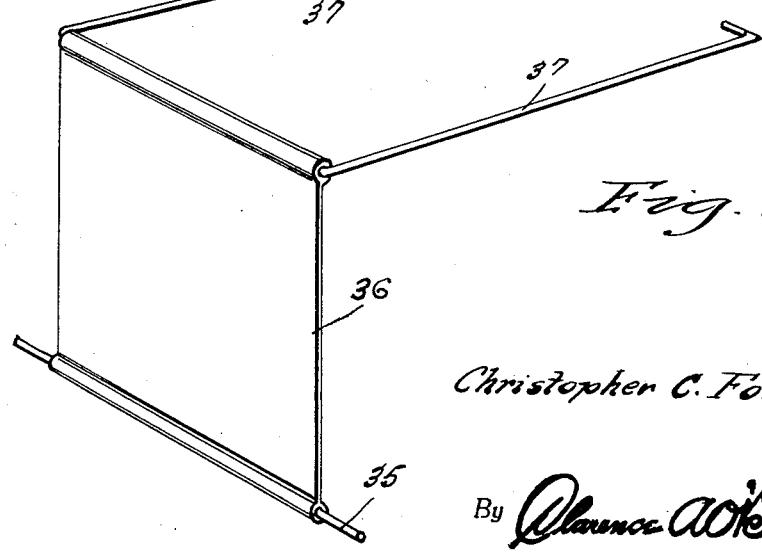
Inventor
Christopher C. Forney
By Clarence A. O'Brien
Attorney

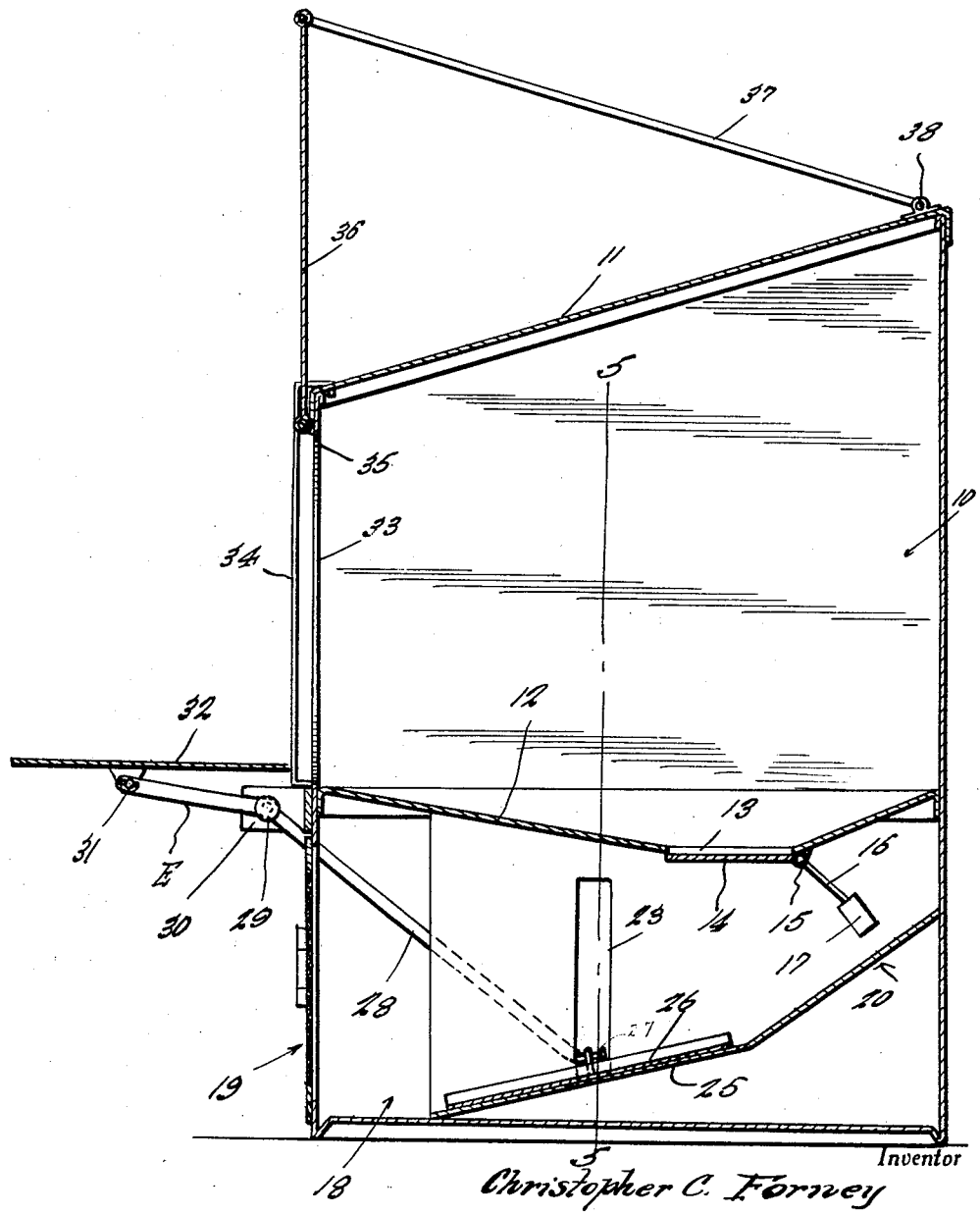

Oct. 4, 1932.  C. C. FORNEY  1,881,122
EGG TRANSFERRING AND SORTING TRAP NEST
Filed April 13, 1931  4 Sheets-Sheet 3
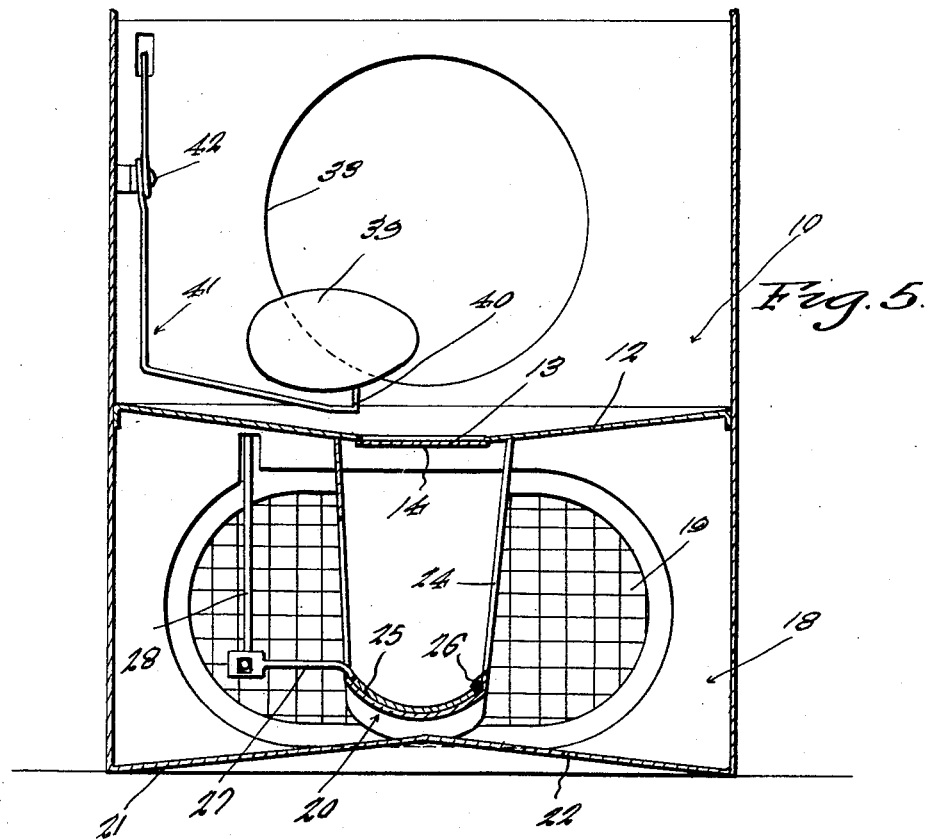
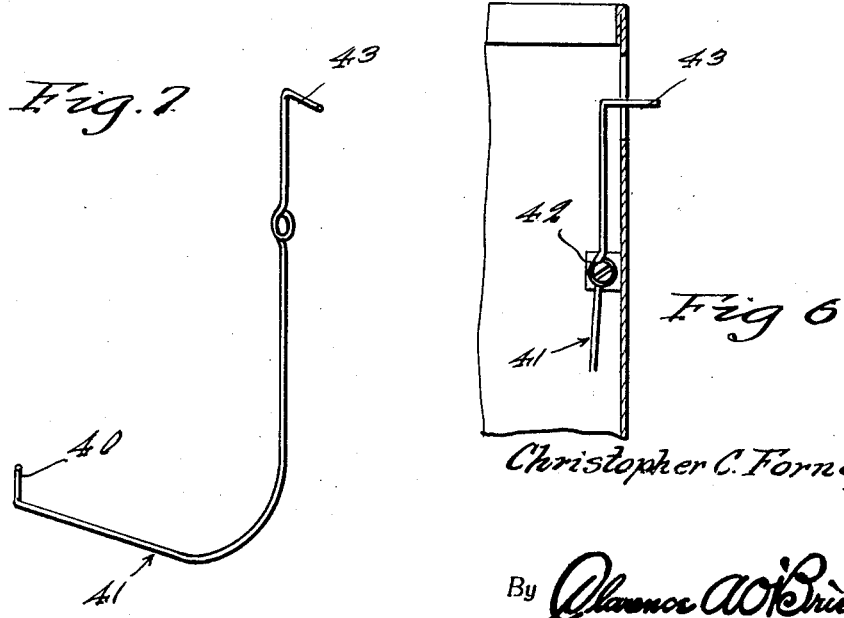
Inventor
Christopher C. Forney
By Clarence A. O'Brien
Attorney Oct. 4, 1932.  C. C. FORNEY  1,881,122
EGG TRANSFERRING AND SORTING TRAP NEST
Filed April 13, 1931     4 Sheets-Sheet 4

Inventor
Christopher C. Forney
By Clarence A. O'Brien
Attorney

Patented Oct. 4, 1932

1,881,122

UNITED STATES PATENT OFFICE

CHRISTOPHER C. FORNEY, OF DOWNS, KANSAS

EGG TRANSFERRING AND SORTING TRAP NEST

Application filed April 13, 1931. Serial No. 529,872.

This invention relates to an improved trap nest of a type designed to automatically trap a laying hen temporarily to expedite isolation, identification and marking of eggs for well known poultry purposes.

Briefly stated, one structural feature of the invention is predicated upon an arrangement of this classification which embodies an artificial or decoy egg located in the nest to entice the hen into the nest, said decoy egg being secured to a trip wire which serves to automatically drop the trap door for entrapping the hen in the nest for identification and egg marking purposes.

A further feature of the invention is founded upon a novel structural means for transferring the egg from the nest proper to a receiving compartment for convenient access and subsequent marking purposes.

A further advantage is embodied in an arrangement of this class which includes a measuring chute in the receiving compartment wherein said chute is constructed with appurtenances to facilitate the separation of large eggs from small eggs. Then too, the inventive conception comprehends an arrangement which includes a fowl entrance platform, a large egg casting plate in the chute, and an operating connection between said plate and platform whereby the depressible action of the platform by the fowl serves to automatically actuate the plate for discharging the large eggs into a part of the receiving compartment distinct from that part which receives the small eggs so as to facilitate size identification for particular hens.

Other features and advantages of the invention will become more readily apparent from the following description and drawings.

In the drawings:

Figure 1 is a front elevation of a trap nest constructed in accordance with the present inventive conception, showing the trap door open.

Figure 2 is a view like Figure 1 showing the trap door dropped to entrance closing position.

Figure 3 is a perspective view of the trap door itself.

Figure 4 is a vertical section on the line 4—4 of Figure 1.

Figure 5 is a vertical section at right angles on the line 5—5 of Figure 4.

Figure 6 is a detail sectional view of the latch or trip end of the trip wire.

Figure 7 is a perspective view of the trip wire itself.

Figure 8:
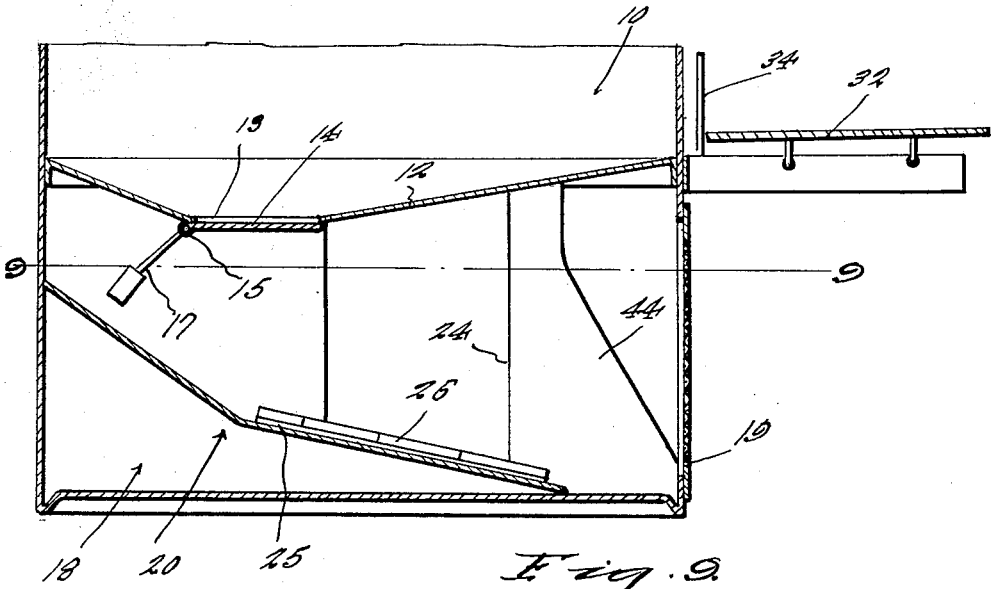
Figure 8 is a longitudinal vertical sectional view through the central portion of the delivery and egg measuring chute.
Figure 9:
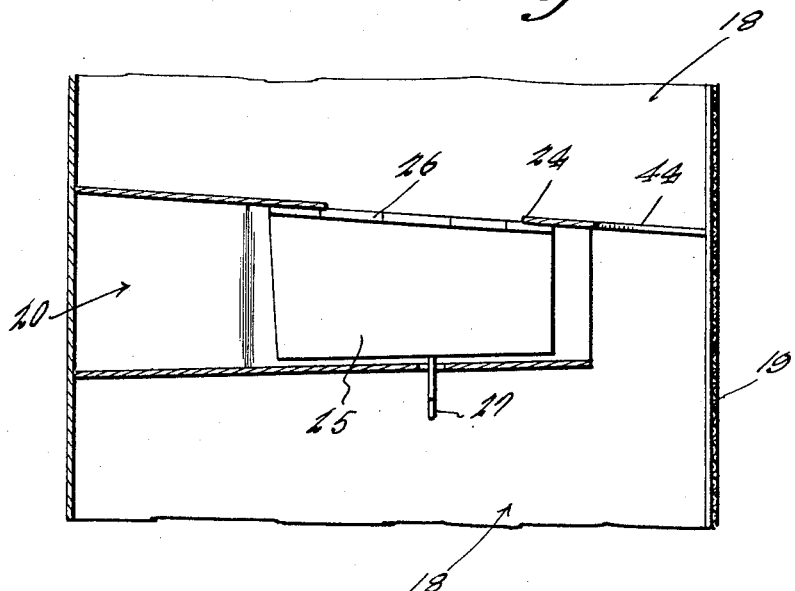
Figure 9 is a horizontal section on the line 9—9 of Figure 8.

The nest, which is of single unit form comprises a sheet metal housing or enclosure, of general rectangular configuration, though it may be of any other suitable form, is so fashioned as to provide an upper compartment 10 which forms the nest proper. The roof or top 11 is inclined to minimize roosting and to shed water and extraneous matter.

The nest 10 is defined by a substantially horizontal partition 12 which is of dished formation and provided at a predetermined point with an egg discharge opening or hole 13. A closure plate or valve 14 is located beneath this hole and is hingedly mounted as at 15 and provided with an arm 16 carrying a counter-weight 17 which holds the plate normally in full closing position. It is obvious however, that the weight of the egg overcomes the counter-weight 17 allowing the egg to be dropped down through the hole 13 in a gentle manner.

The partition also forms beneath itself an egg receiving and identification compartment 18 which has an access opening at its front provided with a hingedly mounted screen door 19 to facilitate removal and inspection. Arranged centrally in this compartment 18 and beneath the hole 13 is a channel-shaped member which defines a chute 20.

This embodies a relatively inclined bottom portion for causing the egg to gravitate down into the visible portions of the receiving compartment 18. In fact, it will be noticed in Figure 5 that the bottom wall includes oppositely inclined portions 21 and 22 to shunt the large and small eggs to the respective division areas of this compartment 18.

In one side wall of the channel 20 is a vertically elongated clearance slot 23. In the opposite wall as indicated at 24 is a large egg throw-out hole which is designed to permit separation of the large eggs from the small eggs.

It will be noticed that the bottom of the channel-shaped chute 20 is transversely curved and located near the discharge end of the chute is a similar curved lifting or casting plate 25 hingedly mounted along one longitudinal edge adjacent the hole 24 as indicated at 26. The opposite edge of the plate is provided with an arm 27 which extends through the slot 23 and is connected with the lower end of an operating link 28. This link 28 extends through an opening in the end wall of the lower compartment and is hingedly mounted as at 29 on a bracket 30 and the extending outer end portion is fastened by a pin and slot connection as at 31 to one end portion of a depressable rockably mounted platform 32.

The platform may be of any suitable shape and may be mounted hingedly in any practical way, such for instance as shown in Figures 1 and 2 of the drawings.

The entrance opening is indicated at 33 and on opposite sides of this are guides 34 receiving the end portions of a guide rod 35 carried by the lower end portion of the trap door 36. The trap door is provided with connecting arms 37 hingedly mounted on the roof and near the back of the structure as indicated at 38 in Figure 4.

The decoy egg, which is of appropriate material, is indicated at 39 and is suitably attached to the upstanding end 40 of a trip wire 41. This wire includes a perpendicular portion having a hinge eye pivotally mounted on a fixture as indicated at 42 in Figure 5. The free laterally directed upper end 43 designates the latch or trip element and this is engaged beneath one of the extending end portions of the rod 35 as indicated in Figure 1.

Under normal conditions, the trap door is elevated, uncovering the entrance opening 33. Thus, the hen longing to occupy the nest for laying enters in a customary manner, being partly enticed by the decoy egg 39. As soon as the hen sits down on this egg 39 trip wire 41 is actuated to release the trap door 36, allowing the door to drop down and trap the hen in the nest.

The egg laid by the hen gravitates to the central part of the depressed partition 12 and into and through the hole 13. The closure plate 14 allows the egg to drop down into to the chute 20. If the egg is sufficiently small to gravitate down through the relatively narrow channel-shaped chute 20, it will roll down through said chute and will be deflected by the wing extension 44 as shown in Figure 8 to the left hand part of the compartment 18.

If the egg is too large to go through the chute, it will rest in the curved casting or lifting plate 25. Consequently, when the platform 32 is depressed by the fowl, the operating link 28 will elevate the free edge portion of the hingedly mounted ejector plate 25 and will throw the egg over into the right hand part of the compartment 18 by way of the relatively large exit hole 24.

Therefore, the large eggs will be separated from the small ones and the screen door 19 will facilitate inspection of the particular size of egg then trapped in the nest. The trap door may be manually released and lifted to allow the hen to escape when the proper identification and marking operations are completed.

Some of the structural features are as follows: First, the principal parts of the entire structure are of weather-proof metal designed to minimize accumulation of vermin and pests. The roof is inclined to minimize roosting and to better shed the elements.

The trap door is efficient in that it is gravity lowered and manually elevated and actuates through the medium of a trip which in turn is actuated by the hen setting on the decoy egg. The partition 12 divides the main box into upper and lower compartments, namely the nest proper and the egg dividing and receiving compartment.

The partition is depressed to form a convenient and comfortable seat for the hen and is apertured to expedite the transfer of the eggs from the nest into the receiving compartment by way of the underlying chute 20. The counterweight closed plate 14 is important in that it allows the egg to be transferred gently from the nest to the chute.

The platform actuated means for operating the lifting plate for casting or shunting the eggs from the chute into one part of the compartment 18 is important. Then too, the extension wing 44 as shown in Figure 8 for delivering the small eggs into one-half of this compartment 18 is likewise important. In fact, all of these details co-operate systematically and mechanically to produce a highly desirable device for fulfilling the requirements of an invention of this class in a highly satisfactory and efficient manner.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to in actual practice if desired.

I claim:

1. A trap nest comprising a housing including nesting means, having a front opening, guides associated with said opening, a gravity lowered trap door including guide rods extending into said guides, a decoy egg arranged in said nest, and an operating connection between the decoy egg and trap door.

2. A trap nest comprising a housing including nesting means, having a front opening, guides associated with said opening, a gravity lowered trap door including guide rods extending into said guides, a decoy egg arranged in said nest, and an operating connection between the decoy egg and trap door, comprising a pivotally mounted trip wire connected at one end with the decoy egg and having a laterally directed terminal latch on its opposite end engageable with one of the guide rods on said trap door.

3. In a trap nest construction of the class described, an enclosure provided with a horizontal partition defining upper and lower compartments, the upper compartment forming the nest proper and the lower compartment being adapted for reception of eggs, said partition being of dished formation and formed with an egg discharge opening, a hingedly mounted closure plate for said opening and counter-balance means for maintaining said plate in a normally closed position so as to permit the eggs to be automatically transferred from the nest into the receiving compartment, and a receiving chute in said receiving compartment permitting the eggs to gravitate gently for access, marking and identification purposes, said chute being of a predetermined width so as to allow the free passage of eggs of a relatively small size and to temporarily retain eggs of a large size, one side wall of the chute being provided with an opening through which the large eggs may be ejected.

4. In a trap nest construction of the class described, an enclosure provided with a horizontal partition defining upper and lower compartments, the upper compartment forming the nest proper and the lower compartment being adapted for reception of eggs, said partition being of dished formation and formed with an egg discharge opening, a hingedly mounted closure plate for said opening and counter-balance means for maintaining said plate in a normally closed position so as to permit the eggs to be automatically transferred from the nest into the receiving compartment, and a receiving chute in said receiving compartment permitting the eggs to gravitate gently for access, marking and identification purposes, said chutes being of a predetermined width so as to allow the free passage of eggs of a relatively small size and to temporarily retain eggs of a large size, one side wall of the chute being provided with an opening through which the large eggs may be ejected, and ejecting means mounted in said chute for casting the eggs laterally with respect to the chute into a predetermined part of said receiving compartment by way of said ejecting opening.

5. In a structure of the class described, a housing including a central partition horizontally arranged to define upper and lower compartments, the upper compartment serving as a nest and the lower compartment serving for receiving eggs, a centrally arranged chute mounted in said lower compartment and dividing it into halves, one half for the small eggs and one-half for the large eggs, the small eggs being freely discharged through said chute, one wall of said chute being provided with an ejecting hole through which the large eggs may be ejected and ejecting means hingedly mounted in said chute.

6. In a structure of the class described, a housing including a central partition horizontally arranged to define upper and lower compartments, the upper compartment serving as a nest and the lower compartment serving for receiving eggs, a centrally arranged chute mounted in said lower compartment and dividing it into halves, one half for the small eggs and one half for the large eggs, the small eggs being freely discharged through said chute, one wall of said chute being provided with an ejecting hole through which the large eggs may be ejected and ejecting means hingedly mounted in said chute, and comprising a hingedly mounted plate swingable in a direction toward said ejecting opening, a platform on the exterior of the nest, and an operating connection between the platform and ejecting plate.

7. In a nest structure of the class described, a housing provided with a nesting plate having an opening and a normally closed closure plate for said opening, a delivery chute mounted beneath said plate and adapted to permit free passage of eggs of a relatively small size and to temporarily hold eggs of a larger size, one wall of said chute having an opening formed therein through which eggs of the larger size may be ejected, a hingedly mounted ejecting plate mounted in the bottom portion of said chute and cooperable with said opening, a hingedly mounted exterior depressible platform, a pivotally mounted operating lever connected at one end with the platform and at the opposite end with said ejector plate.

In testimony whereof I affix my signature.

CHRISTOPHER C. FORNEY.